US012267179B2

(12) United States Patent
Wikström et al.

(10) Patent No.: US 12,267,179 B2
(45) Date of Patent: Apr. 1, 2025

(54) METHOD OF AND A SESSION MANAGEMENT FUNCTION FOR PROVISIONING A USER PLANE FUNCTION, A METHOD OF AND A USER PLANE FUNCTION FOR PROCESSING USER TRAFFIC AND A METHOD OF AND CHARGING FUNCTION FOR CHARGING USER TRAFFIC

(71) Applicant: Telefonaktiebolaget LM Ericsson (publ), Stockholm (SE)

(72) Inventors: Erik Wikström, Gothenburg (SE); Carlos Jimenez Cordon, Madrid (ES); Miguel Angel Muñoz De La Torre Alonso, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 361 days.

(21) Appl. No.: 17/793,272

(22) PCT Filed: Mar. 16, 2020

(86) PCT No.: PCT/EP2020/057017
§ 371 (c)(1),
(2) Date: Jul. 15, 2022

(87) PCT Pub. No.: WO2021/144041
PCT Pub. Date: Jul. 22, 2021

(65) Prior Publication Data
US 2023/0362024 A1 Nov. 9, 2023

(30) Foreign Application Priority Data

Jan. 16, 2020 (EP) .................................. 20382024

(51) Int. Cl.
*H04L 12/14* (2024.01)
*H04W 80/10* (2009.01)
(52) U.S. Cl.
CPC ...... *H04L 12/1407* (2013.01); *H04L 12/1432* (2013.01); *H04W 80/10* (2013.01)
(58) Field of Classification Search
CPC ..... H04W 12/06; H04W 12/08; H04W 88/02; H04W 4/24; H04W 8/20; H04W 12/35
See application file for complete search history.

(56) References Cited

U.S. PATENT DOCUMENTS 10,448,268 B1 10/2019 Jaya et al.
11,095,559 B1 * 8/2021 Garvia .................. H04L 45/124
(Continued)

FOREIGN PATENT DOCUMENTS

WO 2008151561 A1 12/2008

OTHER PUBLICATIONS

Author Unknown, "Technical Specification Group Services and System Aspects; System architecture for the 5G System (5GS); Stage 2 (Release 16)," Technical Specification 23.501, Version 16.3.0, Dec. 2019, 3GPP Organizational Partners, 417 pages.
(Continued)

*Primary Examiner* — Kwasi Karikari
(74) *Attorney, Agent, or Firm* — Withrow & Terranova, PLLC

(57) ABSTRACT

A method of and a Session Management Function, SMF, for provisioning processing rules for user traffic at a User Plane Function, UPF, in a core network of a telecommunication network are disclosed. The core network comprises an Access and Mobility Management Function, AMF and a Policy Control Function, PCF. The SMF first transmits to the PCF a request for obtaining processing rules for user traffic; the SMF then receives from the PCF processing rules
(Continued)

enabling at least one of a Uniform Resource Identifier, URI, level processing policy and a Server Name Indication, SNI, level processing policy for the user traffic and provision the received processing rules with the UPF. The UPF can then process user traffic based on the provisioned processing rules, differentiating the user traffic at the more detailed URI and/or SNI level.

13 Claims, 6 Drawing Sheets

(56) References Cited

U.S. PATENT DOCUMENTS

| | | |
|---|---|---|
| 2014/0016552 A1 | 1/2014 | Nie et al. |
| 2014/0056182 A1 | 2/2014 | Chai |
| 2019/0075107 A1* | 3/2019 | Chiaverini ............ H04L 67/141 |
| 2019/0207778 A1 | 7/2019 | Qiao et al. |
| 2020/0092423 A1* | 3/2020 | Qiao ..................... H04W 80/10 |
| 2020/0245163 A1* | 7/2020 | Jaya ..................... H04L 47/2475 |
| 2021/0289390 A1* | 9/2021 | Zhou ................. H04W 28/0933 |

OTHER PUBLICATIONS

Author Unknown, "Technical Specification Group Services and System Aspects; Procedures for the 5G System (5GS); Stage 2 (Release 16)," Technical Specification 23.502, Version 16.3.0, Dec. 2019, 3GPP Organizational Partners, 558 pages.

Author Unknown, "Technical Specification Group Core Network and Terminals; Interface between the Control Plane and the User Plane Nodes; Stage 3 (Release 16)," Technical Specification 29.244, Version 16.1.0, Sep. 2019, 3GPP Organizational Partners, 243 pages.

International Search Report and Written Opinion for International Patent Application No. PCT/EP2020/057017, mailed Jul. 15, 2020, 18 pages.

International Preliminary Report on Patentability for International Patent Application No. PCT/EP2020/057017, mailed Apr. 19, 2022, 34 pages.

* cited by examiner

METHOD OF AND A SESSION MANAGEMENT FUNCTION FOR PROVISIONING A USER PLANE FUNCTION, A METHOD OF AND A USER PLANE FUNCTION FOR PROCESSING USER TRAFFIC AND A METHOD OF AND CHARGING FUNCTION FOR CHARGING USER TRAFFIC

This application is a 35 U.S.C. § 371 national phase filing of International Application No. PCT/EP2020/057017, filed Mar. 16, 2020, which claims the benefit of European Patent Application No. 20382024.6, filed Jan. 16, 2020, the disclosures of which are incorporated herein by reference in their entireties.

TECHNICAL FIELD

The present disclosure generally relates to the field of a core network in telecommunication networks, and, more specifically, to a method of and a session management function for provisioning a user plane function, a method of and a user plane function for processing user traffic and a method of and charging function for charging user traffic.

BACKGROUND

3GPP TS 29.244, 3$^{rd}$ Generation Partnership Project; Technical Specification Group Core Network and Terminals; Interface between the Control Plane and the User Plane Nodes Stage 3 (Release 16) specifies the Packet Forwarding Control Protocol, PFCP, used between the control plane, CP, function and the user plane, UP, function, which are separated for fifth Generation Core Network, 5GC, based on Control and User Plane Separation, CUPS, strategy introduced by the 3GPP in their Release 14 specifications.

According to 3GPP TS 29.244, the CP function, in particular a Session Management Function, SMF, controls packet processing in the UP function, in particular, a User Plane Function, UPF, by establishing, modifying or deleting PFCP Sessions and by provisioning, i.e. adding, modifying or deleting, Packet Detection Rules, PDRs, Forwarding Action Rules, FARs, Quality of Service, QoS, Enforcement Rules, QERs, and/or Usage Reporting Rules, URRs by activating/deactivating pre-defined PDRs, FARs, QERs, URRs, per PFCP session, whereby a PFCP session may correspond to an individual Packet Data Unit, PDU, session or a standalone PFCP session not tied to any PDU session.

In practice, an incoming packet is first matched, at the UPF, to a PDR comprising a Packet Detection Information, PDI, specifying traffic filters or signatures against which incoming packets are matched. Thereafter, a number of rules associated with the matched PDR, including one FAR, zero, one or more QERs, and zero, one or more URRs providing a set of instructions are applied to the packet matching the PDI of the PDR.

Of the above mentioned rules, an FAR contains instructions related to the processing of packets, specifically forward, duplicate, drop or buffer the packet with or without notifying the CP function about the arrival of a downlink, DL, packet; a QER contains instructions related to QoS enforcement of the traffic; and a URR contains instructions related to traffic measurement and reporting.

Based on the URRs, the UPF measures network resources usage in terms of traffic data volume, duration (i.e. time) and/or events, according to provisioned measurement method in the URRs. The UPF also sends a usage report to the SMF when the measurement reaches a certain threshold, periodically or when detecting a certain event, according to Reporting Triggers provisioned in the URRs or when an immediate report is requested within an PFCP Session Modification Request.

Furthermore, the SMF may report the measured network resource usages in terms of volume and/or duration to a charging function, CHF, allowing the user traffic to be charged accordingly.

The above described traffic analysis and classification through PDRs and reporting through URRs in accordance with 3GPP TS 29.244 classify user traffic according to the provisioned PDRs for a certain PFCP session. A significant part of the user traffic gets classified in default uplink, UL, and DL PDRs. The volume for the user traffic matching the default UL or DL PDR rule can be reported in a URR. However, it is not possible to differentiate this traffic in further detail, for example in terms of different applications and services.

In reality users are often interested in having detailed reports, so as to differentiate all different applications and services. If different applications, say a number of M applications, were to be differentiated by using different PDRs, twice as many, that is, 2*M PDRs, will have to be used. However, many PDRs will result in lower UPF performance, as the performance is inversely proportionally to the number of PDRs per session. In this sense, the current available traffic analysis, classification and reporting scheme lacks the capability to differentiate traffic data in more detail.

Accordingly, there is a genuine need for a method of differentiating user traffic, especially user traffic classified as default traffic, from various sources, which allows detailed analysis and classification of user traffic, for reporting and/or charging purposes, for example.

SUMMARY

In a first aspect of the present disclosure, there is presented a method of provisioning, by a Session Management Function, SMF, processing rules for user traffic, at a User Plane Function, UPF, in a core network of a telecommunication network, the core network comprising an Access and Mobility Management Function, AMF and a Policy Control Function, PCF, the method comprising the steps of:
 transmitting, by the SMF, to the PCF a request for obtaining processing rules for user traffic;
 receiving, by the SMF, from the PCF processing rules enabling at least one of a Uniform Resource Identifier, URI, level processing policy and a Server Name Indication, SNI, level processing policy for the user traffic, and
 provisioning, by the SMF, the received processing rules with the UPF.

The present disclosure is based on the insight that user traffic can be differentiated and processed at a more detailed level by enabling a UPF to support a capability of URI and/or SNI level processing.

For the purpose of controlling the processing or handling of user traffic in a UPF, a SMF first obtains processing rules enabling at least one of a URI and SNI level processing for user traffic, in particular by requesting and receiving the processing rules enabling the URI and/or SNI level processing policy from a PCF. The SMF then provisions the processing rules having the URI and/or SNI level processing policy enabled with the UPF.

In accordance with the present disclosure, the processing rules may not necessarily be regular processing rules such as PCC rules statically provisioned or configured in the CP function such as the SMF. The processing rules may relate to the URI/SNI level processing policy only.

The provisioning of the processing rules enabling the URI and/or SNI level processing at the UPF allows a network operator to differentiate packets of user traffic, which is not known in advance, in terms of sources of the traffic, in particular identified by the URI, such as a web address, a Uniformed Resource Locator, URL, and/or by the SNI, such as a server name. The user traffic can thus be classified, at a more detailed level, based on their sources, and such classification can be used for reporting or charging purposes or both, for example.

In particular, the thus provisioned UPF can analyse packets of the user traffic and detect presence of every single URI and/or SNI. The analysis result may be connected with various actions to be taken towards the user traffic.

In an embodiment of the present disclosure, the transmitting step is performed in response to receiving, by the SMF, a request for establishing a user traffic session from the AMF.

The user traffic session may comprise a Packet Data Unit, PDU, session, initiated by a subscriber via his or her UE and corresponding to a Packet Forwarding Control Protocol, PFCP, session. The method is thus applied to the subscriber initiating the user traffic session. This allows the URI and/or SNI level processing policy to be enabled on a per subscriber basis. It can be contemplated that the processing policies may also be enabled for a group of subscribers, by for example provisioning processing rules enabling URI and/or SNI level processing policy for a group subscribers.

It is also possible to enable the URI and/or SNI level processing policy on a per node basis. The node can comprise a SMF or a UPF. In this case, any traffic session on the SMF or UPF is processed according to the URI and/or SNI level processing policy provisioned with the UPF. Supporting the capability of URI and/or SNI level processing policy by the UPF thus allows much flexibility for the network operators in differentiating the user traffic.

In an embodiment of the present disclosure, the URI level processing policy and SNI level processing policy are comprised in policy data preconfigured in a Unified Data Repository, UDR.

In practice, the SMF, when establishing a particular session, obtains processing rules for user traffic of the session by sending a session management, SM, policy control create request to a PCF. The PCF will then inquiries a UDR having preconfigured policy data to retrieve policy data for the subscriber's sessions.

The UDR answers the inquiry from the PCF with a response message including the policy data for the session, which includes a URI and/or SNI level processing policy for the user traffic of the session. The PCF then generates the processing rules based on the policy data received from the UDR and has the same transmitted to the SMF.

Pre-configuration of the URI and/or SNI level processing policy in the UDR for a particular session associated with a single subscriber or a group of subscribers or a node allows the SMF to retrieve or obtain the processing rules for the user traffic of the session following standard SM policy control creation procedure.

In an embodiment of the present disclosure, the policy data comprises an indication that at least one of the URI level processing policy and the SNI level processing policy is applicable to predefined processing rules, the provisioning comprises a step of configuring, by the SMF, the processing rules pre-defined processing rules with the UPF.

It can be contemplated by those skilled in the art that the having the URI/SNI level processing policy configured as predefined processing rules at the UPF allows processing of user traffic at the URI/SNI level to be performed in a straightforward way.

The policy data obtained by the PCF from the UDR comprises an indication that the processing rules enabling URI and/or SNI level processing policy are applicable as predefined processing rules, it thus allows the SMF to configure the processing rule received from the PCF as pre-defined processing rules easily.

In particular, based on the conventional method as discussed in the background, a large amount of user traffic is classified as default traffic, which will not be further differentiated in terms of traffic sources. In consideration of that, it is advantageous to configure the processing rules enabling URI and/or SNI level processing policy as default pre-defined processing rules. By this means, the user traffic classified as default traffic will be processed at the URI and/or SNI level, thereby differentiated further in terms of their sources.

In an embodiment of the present disclosure, the provisioning step is performed during a Packet Forwarding Control Protocol, PFCP, session establishment procedure and comprises provisioning an enforcement action associated with a Packet Detection Rule, PDR, with the processing rules, the PFCP session related to the user traffic.

In provisioning the processing rules with an enforcement action associated with a PDR, the URI and/or SNI level processing policy of the processing rules is enabled on a per PDR basis. Specifically, user traffic classified as matching the PDR will be processed at the URI and/or SNI level, depending on the enforcement action associated with the PDR.

It thus allows the SMF to, for each PFCP session, activate the URI and/or SNI level processing by provisioning one or more PDRs associated to the corresponding enforcement rule extended to request URI and/or SNI level processing.

As an example, the URI and/or SNI level processing policy may be provisioned with an enforcement action associated with a default UL and/or DL PDR. This is very useful as a significant part of the user traffic gets classified in the default UL and/or DL PDR. Enabling URI and/or SNI level processing for this default UL&DL PDR allows the UPF to differentiate this traffic, for example by reporting volumes and timestamps for each detected URI and/or SNI.

As another example, the URI and/or SNI level processing policy may be provisioned with any other UL and/or DL PDR, such as a PDR matching Real Time Streaming Protocol, RTSP, traffic where URI starts with rtsp://213.230.155.240. Enabling URI level processing for this PDR allows the UPF to differentiate this traffic, for example by reporting volumes and timestamps for each detected sub-URI.

In a specific embodiment of the present disclosure, the enforcement action comprises a Usage Reporting Rule, URR, a bit in a URR related data item at a PFCP session establishment procedure is used to indicate provisioning of the processing rules with the URR.

Provisioning the processing rules enabling URI and/or SNI level processing, in particular, URI and/or SNI level reporting, allows the UPF to measure and report user traffic at the URI and/or SNI level. Such a provisioning allows network operators to simplify the provisioning of rules for processing the user traffic. Especially in comparison with provisioning processing rules at the PDRs, provisioning the processing rules enabling URI and/or SNI level processing at the URR reduces the number of rules for classifying the user traffic, which results in a significant performance improvement.

In an embodiment of the present disclosure, the method further comprises the following step prior to the transmitting step:

receiving, by the SMF, a report on supporting at least one of URI level processing policy and SNI level processing policy from the UPF, in particular by using a data item of UP Function Features.

The UPF may report, in the PFCP association procedure, to the SMF the new capability of supporting URI and/or level processing. This allows the SMF to select a UPF supporting this capability on a per PFCP session basis.

In a second aspect of the present disclosure, there is presented a method of processing, by a User Plane Function, UPF, provisioned according to the method of the first aspect of the present disclosure, user traffic in a telecommunication network, the method comprising the steps of:

receiving, by the UPF, user traffic from a User Equipment, UE, classifying, by the UPF, the user traffic according to a predefined Packet Detection Rule, PDR;

processing, by the UPF, the classified user traffic, in accordance with the processing rules enabling at least one of the URI level processing policy and SNI level processing policy.

The present disclosure allows the UPF to analyse user traffic, such as traffic for a PFCP session which matches the predefined corresponding PDR. For the traffic matching a PDR with this feature enabled, it detects presence of every single URI and/or SNI. The UPF thus can process user traffic already classified according to the PDR at the URI and/or SNI level.

In an embodiment of the present disclosure, the processing policy is Usage Reporting Rule, URR, the processing step comprises recording a volume and optionally a timestamp of the classified traffic on at least one of URI and SNI basis.

When the URR associated to the matching PDR is triggered, the URR is extended to report URI and/or SNI information, specifically volume and timestamps on a per URI and/or SNI basis.

In an embodiment of the present disclosure, the method further comprises reporting the recorded volume and optional timestamp when a report condition is triggered.

Information of user traffic usage in terms of volume and time duration on the URI/SNI level may be used for charging purpose for example. Therefore, when a trigger condition, such as URR threshold including a periodic or volume threshold is reached, the UPF triggers a URR report to report the information on user traffic usage to the SMF.

In an embodiment of the present disclosure, the reporting is performed based on at least one of a URI and SNI data item comprised in a usage report data item of a PFCP session report request.

Extending the PFCP protocol to include the data item, specifically, an Information Element, IE, in the usage report IE within the PFCF session report request message enables the reporting to be performed based on pre-set report triggers.

In an embodiment of the present disclosure, the method further comprises forwarding, by the UPF, the classified user traffic to a destination node.

The classified traffic, after being processed following the method of the present disclosure, may be forwarded to its destination as specified by other enforcement rules configured at the UPF.

In a third aspect of the present disclosure, a method of charging, by a Charging Function, CHF, user traffic in a telecommunication network is provided, the method comprising the steps of:

receiving, by the CHF, from a Session Management Function, SMF, a charging request including at least one of URI and SNI information, the at least one of URI and SNI information comprises a volume and optionally a timestamp for the user traffic based on at least one of per URI and SNI basis, and charging, by the CHF, the user traffic by applying a logic reflecting the at least one of URI and SNI information.

The user traffic can thus be charged according to the method as disclosed herein. It allows the user to view detailed charging information at the URI/SNI level, which helps to provide much better user experience.

In a fourth aspect of the present disclosure, a Session Management Function, SMF, is provided, the SMF arranged for provisioning Policy and Charging Control, PCC, rules for user traffic, at a User Plane Function, UPF, in a core network of a telecommunication network, the core network comprising an Access and Mobility Management Function, AMF and a Policy Control Function, PCF, the SMF comprising:

a transmit equipment arranged for transmitting to the PCF a request for obtaining processing rules for user traffic;

a receive equipment arranged for receiving from the PCF processing rules enabling at least one of a Uniform Resource Identifier, URI, level processing policy and a Server Name Indication, SNI, level processing policy for the user traffic, and a provision equipment arranged for provisioning the received processing rules with the UPF.

In a fifth aspect of the present disclosure, a User Plane Function, UPF, provisioned by the SMF according to the fourth aspect of the present disclosure is provide, the UFP arranged for processing user traffic in a telecommunication network and comprising:

a receive equipment arranged for receiving user traffic from a User Equipment, UE, a classify equipment arranged for classifying the user traffic according to a predefined Packet Detection Rule, PDR, and a processing equipment arranged for processing the classified user traffic, in accordance with the processing rules enabling at least one of the URI level processing policy and SNI level processing policy.

In a sixth aspect of the present disclosure, a charging Function, CHF, for charging user traffic in a telecommunication network is provided, the CHF comprising:

a receive equipment arranged for receiving from a Session Management Function, SMF, a charging request including at least one of URI and SNI information, the at least one of URI and SNI information comprises a volume and optionally a timestamp for the user traffic based on at least one of per URI and SNI basis, and a charging equipment arranged for charging the user traffic by applying a logic reflecting the at least one of URI and SNI information.

A seventh aspect of the present disclosure provides a computer program product, comprising a computer readable storage medium storing instructions which, when executed on at least one processor, cause the at least one processor to carry out the method of the first aspect of the present disclosure.

An eighth aspect of the present disclosure provides a computer program product, comprising a computer readable storage medium storing instructions which, when executed on at least one processor, cause the at least one processor to carry out the method of the second aspect of the present disclosure.

A ninth aspect of the present disclosure provides a computer program product, comprising a computer readable storage medium storing instructions which, when executed on at least one processor, cause the at least one processor to carry out the method of the third aspect of the present disclosure.

The above mentioned and other features and advantages of the disclosure will be best understood from the following description referring to the attached drawings. In the drawings, like reference numerals denote identical parts or parts performing an identical or comparable function or operation.

DETAILED DESCRIPTION

Embodiments contemplated by the present disclosure will now be described in more detail with reference to the accompanying drawings. The disclosed subject matter should not be construed as limited to only the embodiments set forth herein. Rather, the illustrated embodiments are provided by way of example to convey the scope of the subject matter to those skilled in the art.

Figure 1:
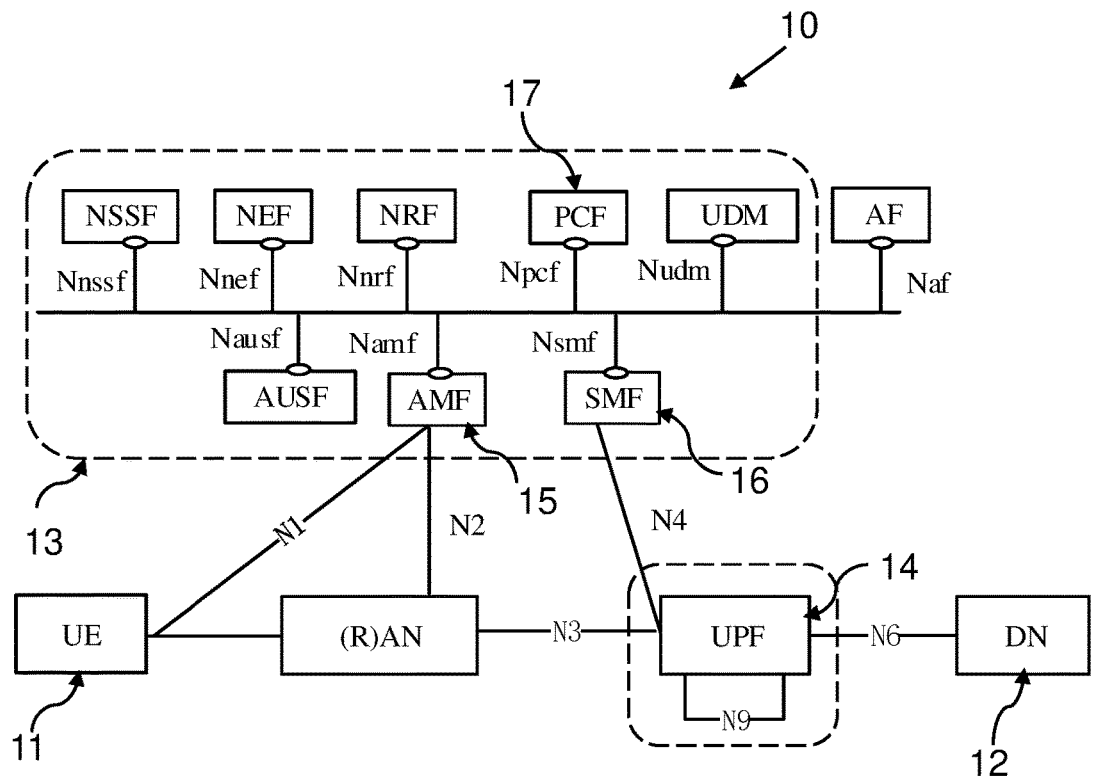
FIG. 1 schematically illustrates a service-based reference architecture for a 5G system as defined by 3GPP.

FIG. 1 schematically illustrates a service-based reference architecture 10 for a 5G System as defined in the 3GPP standard TS23.501, "System Architecture for the 5G system", the contents of which are included herein, by reference.

The 5G system architecture 10 of FIG. 1 illustrates a User Equipment 11 accessing a data network 12 via a 5G network. The system architecture 10 comprises a plurality of network functions, NFs, which comprises a control plane function group 13 and a User Plane Function, UPF, 14. NFs in the control fiction group 13 that are specially relevant to the present disclosure are an Access and Mobility Management Function, AMF, 15, a Session Management Function, SMF, 16 and a Policy Control function, PCF, 17.

Figure 2:
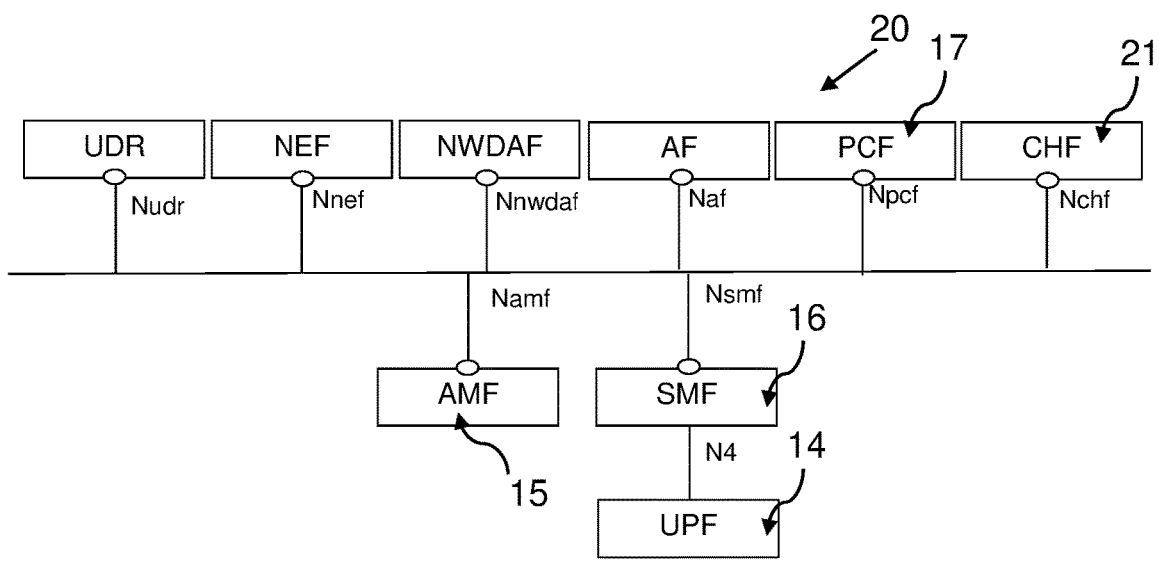
FIG. 2 schematically illustrates a 3GPP 5G core network architecture for policy, charging and analytics.

FIG. 2 schematically illustrates a 3GPP 5G core network architecture 20 for policy, charging and analytics. Of the NFs illustrated in FIG. 2, the following NFs are especially relevant to the present disclosure:

Charging Function, CHF 21: the CHF supports offline and online charging functionality and exposes the Nchf interface towards consumers of the CHF, for example, a Session Management Function, SMF 16

The PCF 17: the PCF supports unified policy framework to govern network behaviour. Specifically, the PCF 17 provides Policy and Charging Control, PCC, rules to the SMF 16.

The SMF 16: the SMF is responsible for enforcement of session management related policy decisions from the PCF 17, such as decisions related to service flow detection, QoS, charging, traffic usage reporting, for example. The SMF supports different functionality, such as session establishment, modify and release, and policy related functionalities such as termination of interfaces towards PCF 17, charging data collection, support of charging interfaces and control and coordination of charging data collection at a user plane function, UPF 14.

Specifically, the SMF 16 supports requesting and receiving PCC rules from the PCF 17 and deriving rules from the PCC rules and providing or configuring those rules to the UPF 14 accordingly through N4 reference point, that i.e., Packet Forwarding Control Protocol, PFCP.

The UPF 14: the UPF supports handling of UP traffic based on the rules received from SMF 16. Specifically, for the present disclosure, the UPF 14 supports packet inspection through Packet Detection Rules, PDRs and different enforcement actions, such as traffic steering, charging/reporting through Forwarding Action Rules, FARs, QoS Enforcement Rules, QERs, and/or Usage Reporting rules, URRs.

Figure 3:
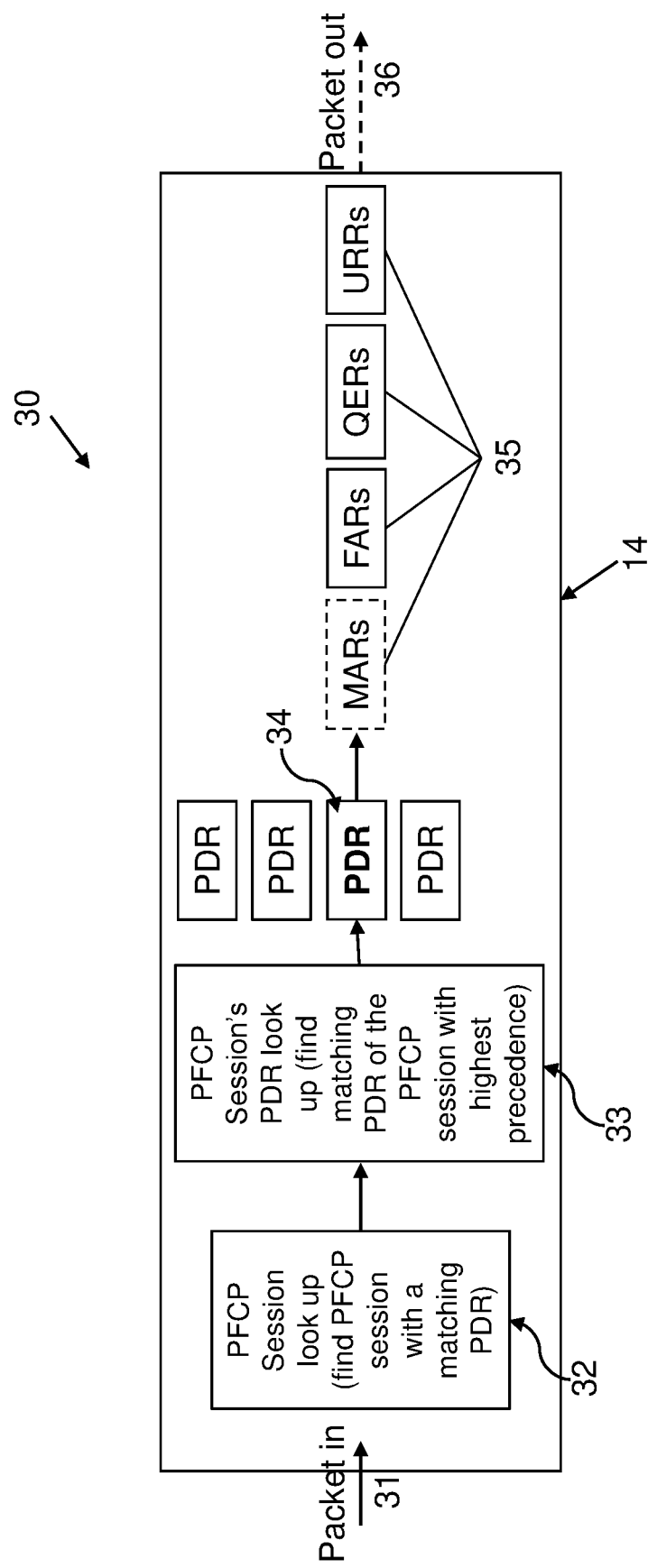
FIG. 3 schematically illustrates a packet processing flow in a User Plane Function, UPF, in accordance with 3GPP TS 29.244.

FIG. 3 schematically illustrates a packet processing flow 30 in the UPF 14 in accordance with 3GPP TS 29.244.

In accordance with FIG. 3, on receipt 31 of a user plane packet, the UPF 14 performs a lookup of provisioned PDRs. Specifically, the UPF 14 first identifies 32 a PFCP session to which the packet corresponds, and then finds 33 a first PDR 34 matching the incoming packet, among all PDRs provisioned for this PFCP session, starting with the PDRs with the highest precedence and continuing then with PDRs in decreasing order of precedence. Thereafter, a number of rules or enforcement actions 35 associated with the matched PDR 34, including for example FARs, QERs, and URRs are applied to the packet matching the PDR 34. The processed packet may then leave 36 the UPF 14

For the purpose of differentiating user traffic at more detailed level, the above described PFCP protocol requires provisioning of a large number of PDRs, which will result in low processing performance.

In the following, a method of provisioning a UPF with processing rules, in particular, traffic reporting rules, by a SMF will be described. It can be contemplated that the method of the present disclosure may also be used for provisioning other rules at the UPF.

Figure 4:
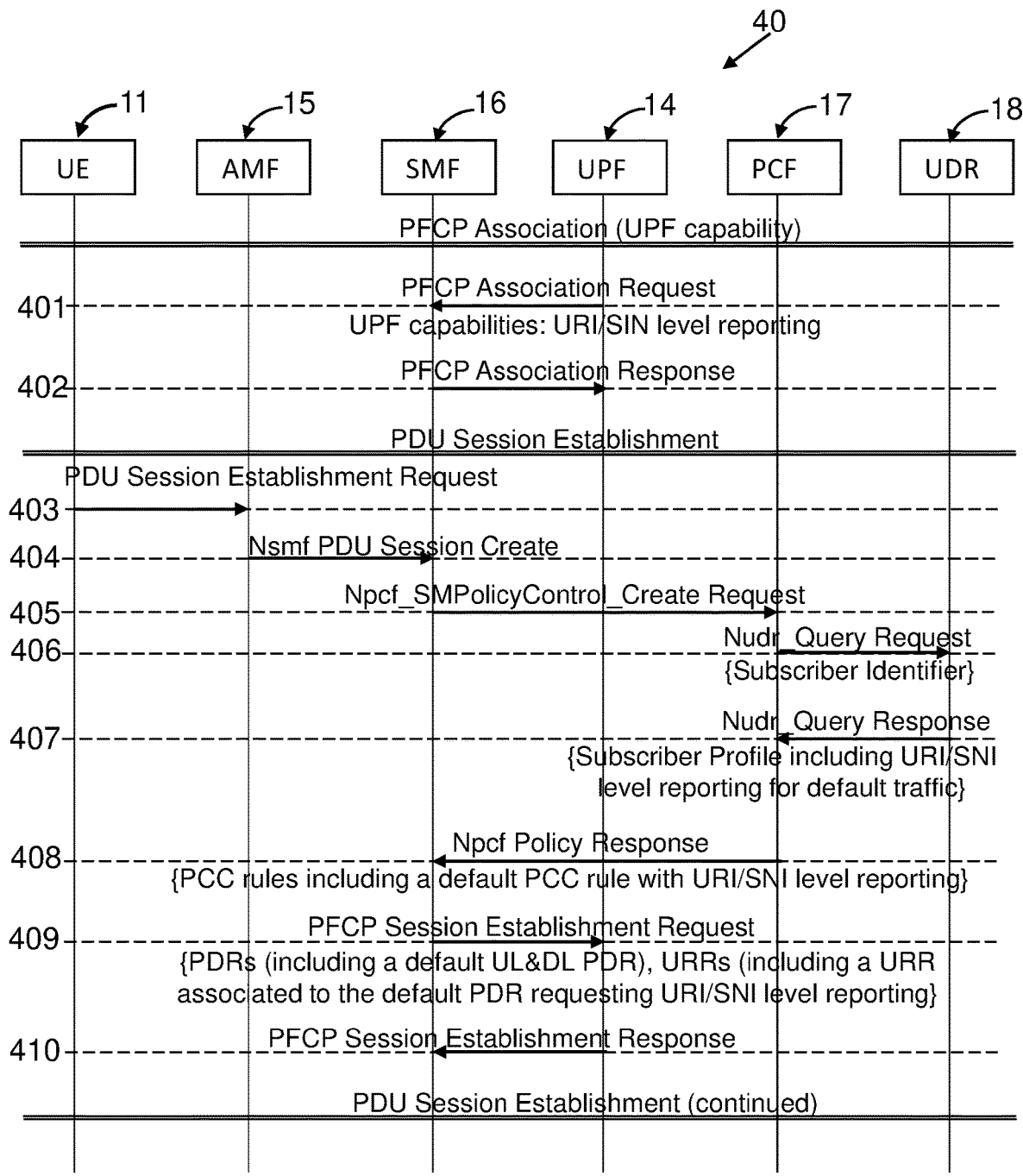
FIG. 4 schematically illustrates, in a sequence diagram, a method of provisioning Uniform Resource Identifier, URI, and/or Server Name Indication, SNI level reporting policy for user traffic in a UPF by a Session Management Function, SMF, in accordance with an embodiment of the present disclosure.

FIG. 4 schematically illustrates, in a sequence diagram, a method 40 of provisioning Uniform Resource Identifier, URI, and/or Server Name Indication, SNI level reporting policy for user traffic in a UPF 14 by a SMF 16, in accordance with an embodiment of the present disclosure.

It is noted that a precondition for the method 40 of FIG. 4 is that URI and/or SNI level reporting policy for user traffic, such as default traffic, is pre-configured in a Unified Data Repository, UDR, 18 as subscriber policy data.

Steps 401 and 402 illustrate a PFCP Association setup procedure between the UPF 14 and the SMF 16. A PFCP Association shall be set up between the CP function, that is, the SMF 16, and the UPF 14 prior to establishing a PFCP session for user traffic on that UPF 14. The PFCP Association procedure in FIG. 4 is illustrated to be initiated by the UPF 4. Those skilled in the art will understand that the PFCP Association procedure may also be initiated by the SMF 16.

At step 401, the UPF 14 UPF initiates the PFCP Association Setup procedure by sending a "PFCP Association Request" to the SMF 16, to request setting up an PFCP association towards the SMF 16. The UPF 14 sends the PFCP Association Setup Request including a Node ID of the UPF and information of all supported optional features in the UPF, including a new capability of URI/SNI level reporting.

In sending the PFCP association request, the UPF 14 reports its capabilities, in particular, the capability of URI/SNI level reporting, USRU, to the SMF 16. This allows the SMF 16 to know which UPFs support this capability and thus can influence on UPF selection.

Support for the new capability USRU is indicated in UP function features as illustrated in Table 1. Information elements of the UP Function Features use each bit to indicate that a corresponding feature is supported. In Table 1, bit 8/4, expressed in bold, is used to indicate that URI/SNI level reporting is supported by the UPF 14.

TABLE 1

UP Function Features

| Feature Octet/Bit | Feature | Interface | Description |
|---|---|---|---|
| 5/1 | BUCP | Sxa, N4 | Downlink Data Buffering in CP function is supported by the UP function. |
| 5/2 | DDND | Sxa, N4 | The buffering parameter 'Downlink Data Notification Delay' is supported by the UP function. |
| 5/3 | DLBD | Sxa, N4 | The buffering parameter 'DL Buffering Duration' is supported by the UP function. |
| 5/4 | TRST | Sxb, Sxc, N4 | Traffic Steering is supported by the UP function. |
| 5/5 | FTUP | Sxa, Sxb, N4 | F-TEID allocation/release in the UP function is supported by the UP function. |
| 5/6 | PFDM | Sxb, Sxc, N4 | The PFD Management procedure is supported by the UP function. |
| 5/7 | HEEU | Sxb, Sxc, N4 | Header Enrichment of Uplink traffic is supported by the UP function. |
| 5/8 | TREU | Sxb, Sxc, N4 | Traffic Redirection Enforcement in the UP function is supported by the UP function. |
| 6/1 | EMPU | Sxa, Sxb, N4 | Sending of End Marker packets supported by the UP function. |
| 6/2 | PDIU | Sxa, Sxb, Sxc, N4 | Support of PDI optimised signalling in UP function (see clause 5.2.1A.2). |
| 6/3 | UDBC | Sxb, Sxc, N4 | Support of UL/DL Buffering Control |
| 6/4 | QUOAC | Sxb, Sxc, N4 | The UP function supports being provisioned with the Quota Action to apply when reaching quotas. |
| 6/5 | TRACE | Sxa, Sxb, Sxc, N4 | The UP function supports Trace (see clause 5.15). |

TABLE 1-continued

UP Function Features

| Feature Octet/Bit | Feature | Interface | Description |
|---|---|---|---|
| 6/6 | FRRT | Sxb, N4 | The UP function supports Framed Routing (see IETF RFC 2865 [37] and IETF RFC 3162 [38]). |
| 6/7 | PFDE | Sxb, N4 | The UP function supports a PFD Contents including a property with multiple values. |
| 6/8 | EPFAR | Sxa, Sxb, Sxc, N4 | The UP function supports the Enhanced PFCP Association Release feature (see clause 5.18). |
| 7/1 | DPDRA | Sxb, Sxc, N4 | The UP function supports Deferred PDR Activation or Deactivation. |
| 7/2 | ADPDP | Sxa, Sxb, Sxc, N4 | The UP function supports the Activation and Deactivation of Pre-defined PDRs (see clause 5.19). |
| 7/3 | UEIP | N4 | The UPF supports allocating UE IP addresses or prefixes (see clause 5.21). |
| 7/4 | SSET | N4 | UPF support of PFCP sessions successively controlled by different SMFs of a same SMF Set (see clause 5.22). |
| 7/5 | MNOP | Sxa, Sxb, Sxc, N4 | UPF supports measurement of number of packets which is instructed with the flag 'Measurement of Number of Packets' in a URR. See also 5.2.2.2.1. |
| 7/6 | MTE | N4 | UPF supports multiple instances of Traffic Endpoint IDs in a PDI. |
| 7/7 | BUNDL | Sxa, Sxb, Sxc, N4 | PFCP messages bunding (see clause 6.5) is supported by the UP function. |
| 7/8 | GCOM | N4 | UPF support of 5G VN Group Communication. (See clause 5.23) |
| 8/1 | MPAS | N4 | UPF support for multiple PFCP associations to the SMFs in an SMF set (see clause 5.22.3). |
| 8/2 | RTTL | N4 | The UP function supports redundant transmission at transport layer. |
| 8/3 | VTIME | Sxb, N4 | UPF support of quota validity time feature. |
| 8/4 | USRU | Sxb, Sxc, N4 | URI/SNI level reporting is supported by the UP function. |

At step 402, when receiving the "PFCP Association Request", the SMF 16 stores the Node ID of the UPF 14 as an identifier of the PFCP association, if the SMF 16 accepts the request. The SMF 16 further sends a "PFCP Association Response" with a successful cause, its Node ID, and information of a list of optional features the SMF 16 supports which may affect the UP function behaviour, if any.

By the above steps the SMF 16 is notified of the URI/SNI level reporting supported by the UPF 14.

At step 403, a UE 11 triggers PDU session establishment, by sending a "PDU Session Establishment Request" to an AMF 15. The AMF 15 selects an SMF to manage the PDU session, that is, a SMF selection function in the AMF 15 selects an SMF instance based on available SMF instances obtained from Network Repository Function, NRF, or based on configured SMF information in the AMF 15 and triggers 404 "Nsmf PDU Session Create" to the SMF 16.

The example as described herein refers to a scenario where a PFCP session corresponds to a PDU session initiated by a subscriber via his or her UE. It is also possible that the PFCP session is a standalone PFCP session not tied to any PDU session used e.g. for forwarding RADIUS, Diameter or Dynamic Host Configuration Protocol, DHCP, signalling between the SMF 16 and a DN 12 or for forwarding End Marker packets from the SMF 16 to a downstream UPF or next generation Radio Access Network, NG-RAN.

Note the sequence diagram 40 in FIG. 4 does not include all the signalling messages involved in the PDU Session Establishment procedure. Instead, only signalling messages relevant to the present disclosure are described in subsequent steps.

At step 405, the SMF 16 triggers "Npcf_SMPolicyControl_Create Request" message, to a PCF, 17 to request creation of a corresponding session management, SM, policy association with the PCF 17 and to retrieve SM policies for the user PDU session. Specifically, the "Npcf_SMPolicyControl_Create" procedure enables provisioning of PCC rules by the PCF 17 to the SMF 16, of which charging related information of PDU sessions may be provisioned.

The PCF 17 may receiving charging related information from a Unified Data Repository, UDR, 18 as part of policy data subscription information which is preconfigured in the UDR beforehand.

In the present example, at step 406, the PCF 17 triggers a "Nudr_Query Request" message, to the UDR 18, including a subscriber identifier to retrieve the policy data for this subscriber's PDU session.

At step 407, the UDR 18 answers with a "Nudr_Query Response" message including the Subscriber Policy Data, which includes a URI and/or SNI level reporting policy, which may be applied, for example towards, all kind of user traffic, such as default traffic.

In the example of the sequence diagram in FIG. 4, the solution proposed in the present disclosure is enabled on a per subscriber basis, that is, the URI/SNI level reporting is specifically enabled for this subscriber's PDU session. Moreover, the URI/SNI level reporting is enabled on a per PCC rule basis, that is, specifically for the default PCC rule, and not for the other PCC rules.

It can be contemplated by those skill in the art that the URI/SNI level reporting may also be enabled on a per group of subscribers basis or on a per node basis, which can be implemented by adapting the signalling procedure accordingly.

The PCF 17 generates corresponding PCC rules based on the subscriber policy data retrieved from the UDR 18. In particular, the PCF 17 generates a default PCC rule with URI/SNI level reporting enabled. In this example, the subscriber policy data retrieved by the PCF 17 from the UDR 18 may include an indication, such as a flag, to enable the solution described in the present disclosure only for the default PCC rule.

It can contemplated by those skilled in the art that the PCC rules may also be configured as other rules, not necessarily as the default PCC rule.

Although the PCC rules may be configured as dynamic PCC rules, in order to minimize the impacts on PCF, it is proposed to use pre-defined PCC rules, as follows:

PCC rule #X is the default pre-defined PCC rule when the solution of the present disclosure is disabled.

PCC rule #Y is the default pre-defined PCC rule when the solution of the present disclosure is enabled.

In the example shown in FIG. 4, the PCF 17 will activate the PCC rule #Y based on the UDR flag described above.

It can be contemplated by those skilled in the art that the generated PCC rules for other actions and processing may also be configured accordingly.

At step 408, the generated PCC rules are transmitted to the SMF 16 by sending a "Npcf Policy Response" message.

At step 409, the SMF 16 triggers "PFCP Session Establishment" procedure towards the UPF 14 to provision or configure the PDRs, and the corresponding enforcement actions, FARs, URRs and the like, for the PDU session. The UPF 14 creates the PDRs accordingly and, at step 410, responds with a "PFCP Session Establishment Response" message.

Specifically, when receiving from the PCF 17 the default pre-defined PCC rule #Y, the SMF 16 locally configures that this rule #Y refers to enabling the solution proposed in the present disclosure. Based on this information, the SMF 16 will provision a default PDR, including both UL PDR and DL PDR, with lowest precedence for the purpose of matching all user traffic. The default PDR may be associated to a URR with URI/SNI reporting enabled.

The above provision may be implemented by extending the PFCP protocol by adding a new flag, that is, a bit, in Measurement Information IE at "PFCP Session Establishment/Modification Request" in "Create/Update URR IE", as shown in Table 2 in bold.

TABLE 2

| Create URR IE within PFCP Session Establishment Request | | | | | | |
|---|---|---|---|---|---|---|
| Octet 1 and 2 | | Create URR IE Type = 6 (decimal) | | | | |
| Octets 3 and 4 | | Length = n | | | | |

| Information elements | P | Condition/Comment | Appl. Sx a | Sx b | Sx c | N4 IE Type |
|---|---|---|---|---|---|---|
| URR ID | M | This IE shall uniquely identify the URR among all the URRs configured for this PFCP session. | X | X | X | X URR ID |
| Measurement Method | M | This IE shall indicate the method for measuring the network resources usage, i.e. whether the data volume, duration (i.e. time), combined volume/duration, or event shall be measured. | X | X | X | X Measurement Method |
| Reporting Triggers | M | This IE shall indicate the trigger(s) for reporting network resources usage to the CP function, e.g. periodic reporting or reporting upon reaching a threshold, or envelope closure. | X | X | X | X Reporting Triggers |
| Measurement Period | C | This IE shall be present if periodic reporting is required. When present, it shall indicate the period for generating and reporting usage reports. | X | X | X | X Measurement Period |

TABLE 2-continued

| IE | P | Description | | | | | IE Type |
|---|---|---|---|---|---|---|---|
| Volume Threshold | C | This IE shall be present if volume-based measurement is used and reporting is required upon reaching a volume threshold. When present, it shall indicate the traffic volume value after which the UP function shall report network resources usage to the CP function for this URR. | X | X | X | X | Volume Threshold |
| Volume Quota | C | This IE shall be present if volume-based measurement is used and the CP function needs to provision a Volume Quota in the UP function (see clause 5.2.2.2) When present, it shall indicate the Volume Quota value. | — | X | X | X | Volume Quota |
| Event Threshold | C | This IE shall be present if event-based measurement is used and reporting is required upon reaching an event threshold. When present, it shall indicate the number of events after which the UP function shall report to the CP function for this URR. | — | X | X | X | Event Threshold |
| Event Quota | C | This IE shall be present if event-based measurement is used and the CP function needs to provision an Event Quota in the UP function (see clause 5.2.2.2) When present, it shall indicate the Event Quota value. | — | X | X | X | Event Quota |
| Time Threshold | C | This IE shall be present if time-based measurement is used and reporting is required upon reaching a time threshold. When present, it shall indicate the time usage after which the UP function shall report network resources usage to the CP function for this URR. | X | X | X | X | Time Threshold |
| Time Quota | C | This IE shall be present if time-based measurement is used and the CP function needs to provision a Time Quota in the UP function (see clause 5.2.2.2) When present, it shall indicate the Time Quota value | — | X | X | X | Time Quota |
| Quota Holding Time | C | This IE shall be present, for a time, volume or event-based measurement, if reporting is required and packets are no longer permitted to pass on when no packets are received during a given inactivity period. When present, it shall contain the duration of the inactivity period. | — | X | X | X | Quota Holding Time |
| Dropped DL Traffic Threshold | C | This IE shall be present if reporting is required when the DL traffic being dropped exceeds a threshold. When present, it shall contain the threshold of the DL traffic being dropped. | X | — | — | X | Dropped DL Traffic Threshold |
| Quota Validity Time | C | This IE shall be present if reporting is required when the Quota Validity time for a given Quota is over. | — | X | — | X | Quota Validity Time |
| Monitoring Time | O | When present, this IE shall contain the time at which the UP function shall re-apply the volume or time threshold. | X | X | X | X | Monitoring Time |
| Subsequent Volume Threshold | O | This IE may be present if the Monitoring Time IE is present and volume-based measurement is used. When present, it shall indicate the traffic volume value after which the UP function shall report network resources usage to the CP function for this URR for the period after the Monitoring Time. | X | X | X | X | Subsequent Volume Threshold |
| Subsequent Time Threshold | O | This IE may be present if the Monitoring Time IE is present and time-based measurement is used. When present, it shall indicate the time usage after which the UP function shall report network resources usage to the CP function for this URR for the period after the Monitoring Time. | X | X | X | X | Subsequent Time Threshold |
| Subsequent Volume Quota | O | This IE may be present if Monitoring Time IE is present and volume-based measurement is used (see clause 5.2.2.2). When present, it shall indicate the Volume Quota value which the UP function shall use for this URR for the period after the Monitoring Time. | — | X | X | X | Subsequent Volume Quota |
| Subsequent Time Quota | O | This IE may be present if Monitoring Time IE is present and time-based measurement is used (see clause 5.2.2.2) When present, it shall indicate the Time Quota value which the UP function shall use for this URR for the period after the Monitoring Time. | — | X | X | X | Subsequent Time Quota |
| Subsequent Event Threshold | O | This IE may be present if the Monitoring Time IE is present and event-based measurement is used. When present, it shall indicate the number of events after which the UP function shall report to the CP function for this URR for the period after the Monitoring Time. | — | X | X | X | Subsequent Event Threshold |
| Subsequent Event Quota | O | This IE may be present if Monitoring Time IE is present and event-based measurement is used (see clause 5.2.2.2). When present, it shall indicate the Event Quota value which the UP function shall use for this URR for the period after the Monitoring Time. | — | X | X | X | Subsequent Event Quota |

TABLE 2-continued

| | | | | | | | |
|---|---|---|---|---|---|---|---|
| Inactivity Detection Time | C | This IE shall be present if time-based measurement is used and the time measurement need to be suspended when no packets are received during a given inactivity period. When present, it shall contain the duration of the inactivity period. | — | X | X | X | Inactivity Detection Time |
| Linked URR ID | C | This IE shall be present if linked usage reporting is required. When present, this IE shall contain the linked URR ID which is related with this URR (see clause 5.2.2.4).<br>Several IEs with the same IE type may be present to represent multiple linked URRs which are related with this URR. | — | X | X | X | Linked URR ID |
| Measurement Information | C | This IE shall be included if any of the following flag is set to 1.<br>Applicable flags are:<br>Measurement Before QoS Enforcement Flag: this flag shall be set to 1 if the traffic usage before any QoS Enforcement is requested to be measured. | — | X | X | X | Measurement Information |
| | | Inactive Measurement Flag: this flag shall be set to 1 if the measurement shall be paused (inactive). The measurement shall be performed (active) if the bit is set to 0 or if the Measurement Information IE is not present in the Create URR IE. | — | X | — | X | |
| | | Reduced Application Detection Information Flag: this flag may be set to 1, if the Reporting Triggers request to report the start or stop of application, to request the UP function to only report the Application ID in the Application Detection Information, e.g. for envelope reporting. | — | X | — | X | |
| | | Immediate Start Time Metering Flag: this flag may be set to 1 if time-based measurement is used and the UP function is requested to start the time metering immediately at receiving the flag. | — | X | X | X | |
| | | Measurement of Number of Packets Flag: this flag may be set to 1 when the Volume-based measurement applies, to request the UP function to report the number of packets in UL/DL/Total in addition to the measurement in octet. | X | X | X | X | |
| | | URI/SNI reporting Flag: this flag may be set to 1 if URI/SNI reporting is required | — | X | X | X | |
| Time Quota Mechanism | C | This IE shall be present if time-based measurement based on CTP or DTP is used. | — | X | — | — | Time Quota Mechanism |
| Aggregated URRs | C | This IE shall be included if the URR is used to support a Credit Pool.<br>Several IEs with the same IE type may be present to provide multiple aggregated URRs. | — | X | — | — | Aggregated URRs |
| FAR ID for Quota Action | C | This IE may be present if the Volume Quota IE and/or the Time Quota IE and/or Event Quota IE is provisioned in the UR and the UP Function indicated support of the Quota Action feature.<br>When present, it shall contain the identifier of the substitute FAR the UP function shall apply, for the traffic associated to this URR, when exhausting any of these quotas. See NOTE 1. | — | X | X | X | FAR ID |
| Ethernet Inactivity Timer | C | This IE shall be present if Ethernet traffic reporting is used and the SMF requests the UP function to also report inactive UE MAC addresses.<br>When present, it shall contain the duration of the Ethernet inactivity period. | — | — | — | X | Ethernet Inactivity Timer |
| Additional Monitoring Time | O | When present, this IE shall contain the time at which the UP function shall re-apply the volume or time or event threshold/quota provisioned in the IE.<br>Several IEs with the same IE type may be present to provide multiple Monitoring Times. | X | X | X | X | Additional Monitoring Time |

NOTE 1:
The substitute FAR used when exhausting a Volume Quota or Time Quota may be set to drop the packets or redirect the traffic towards a redirect destination as specified in clause 5.4.7.

The above describes the provisioning of the UPF 14 by the SMF 16 with the URI/SNI level reporting for the user traffic.

Figure 5:
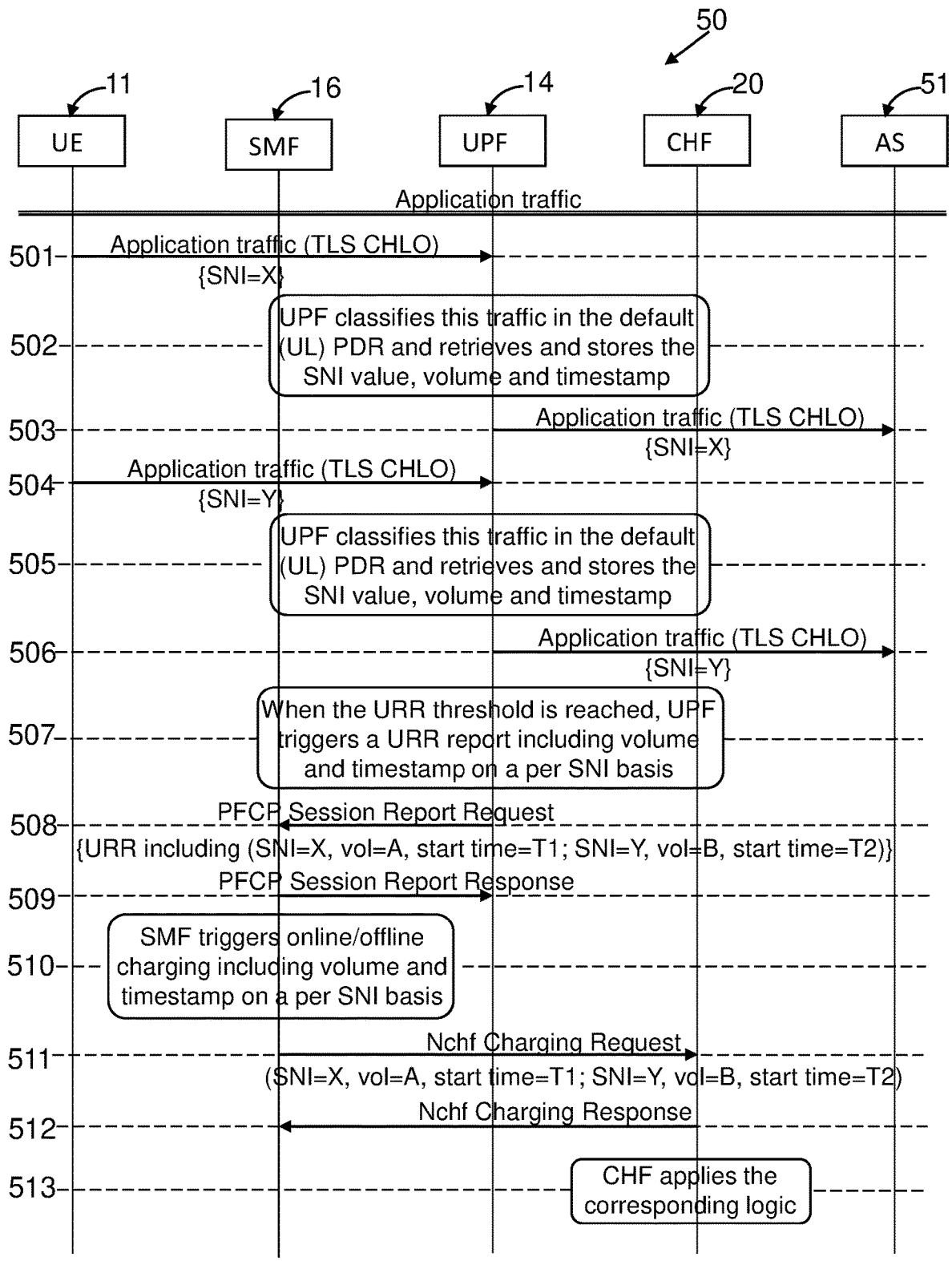
FIG. 5 schematically illustrates a method of processing user traffic by a UPF and a method of charging user traffic by a charging function, CHF, in a telecommunication network, in accordance with an embodiment of the present disclosure.

With the URI/SNI level reporting configured as the URR at the UPF, after the PDU session is successfully established, the UE 11 may start sending application traffic. FIG. 5 schematically illustrates a method of processing user traffic by the UPF 14 and a method of charging user traffic by a charging function, CHF, in a telecommunication network, in accordance with an embodiment of the present disclosure.

At step 501, the UE 11 transmit application traffic such as a Transport layer Security, TLS, Client Hello including SNI=X to the UFP 14.

At steps 502, the UPF 14 classifies this traffic in the default UL PDR, as the traffic in this example does not match any other UL PDR with higher precedence. The UPF 14 also retrieves and stores the SNI value X and a timestamp to record a start time T1 when the traffic with SNI=X was accessed. The SNI level reporting is enabled for the above traffic, which is indicated by SNI=X.

At step 503, the traffic is forwarded by the UPF 14, according to an associated FAR rule for example, towards its destination application server, AS, 51.

At step 504, the UE 11 continues sending application traffic, such as a TLS Client Hello including SNI=Y.

At step 505, the UPF 14 classifies this traffic in the default UL PDR, as the traffic in this example does not match any other UL PDR with higher precedence. The UPF 14 also retrieves and stores the SNI value Y and a timestamp to record a start time T2 when the SNI=Y was accessed. The SNI level reporting is enabled for the above traffic, which is indicated by SNI=Y.

At step 506, the traffic is forwarded by the UPF 14, according to an associated FAR rule towards its destination AS 51.

At step 507, when a URR threshold as configured in an associated URR, such as a periodic or volume threshold, is reached, the UPF 14 generates or triggers a usage report for the related URR, including a volume, and optionally the timestamp, on a per SNI basis and sends the usage report to the SMF 16 at step 508 by initiating a PFCF Session Report procedure.

TABLE 3

Usage Report IE within PFCP Session Report Request

| Octet 1 and 2 | | | Usage Report IE Type = 80 (decimal) | | | | |
| Octets 3 and 4 | | | Length = n | | | | |

| Information elements | P | Condition/Comment | Appl. Sx a | Sx b | Sx c | N4 | IE Type |
|---|---|---|---|---|---|---|---|
| URR ID | M | This IE shall identify the URR for which usage is reported. | X | X | X | X | URR ID |
| UR-SEQN | M | This IE shall uniquely identify the Usage Report for the URR (see clause 5.2.2.3). | X | X | X | X | UR-SEQN |
| Usage Report Trigger | M | This IE shall identify the trigger for this report. | X | X | X | X | Usage Report Trigger |
| Start Time | C | This IE shall be present, except if the Usage Report Trigger indicates 'Start of Traffic', 'Stop of Traffic' or 'MAC Addresses Reporting'. When present, this IE shall provide the timestamp when the collection of the information in this report was started. | X | X | X | X | Start Time |
| End Time | C | This IE shall be present, except if the Usage Report Trigger indicates 'Start of Traffic', 'Stop of Traffic' or 'MAC Addresses Reporting'. When present, this IE shall provide the timestamp when the collection of the information in this report was generated. | X | X | X | X | End Time |
| Volume Measurement | C | This IE shall be present if a volume measurement needs to be reported. | X | X | X | X | Volume Measurement |
| Duration Measurement | C | This IE shall be present if a duration measurement needs to be reported. | X | X | X | X | Duration Measurement |
| Application Detection Information | C | This IE shall be present if application detection information needs to be reported. | — | X | X | X | Application Detection Information |
| UE IP address | C | This IE shall be present if the start or stop of an application has been detected and no UE IP address was provisioned in the PDI. See NOTE 1. | — | — | X | X | UE IP address |
| Network Instance | C | This IE shall be present if the start or stop of an application has been detected, no UE IP address was provisioned in the PDI and multiple PDNs with overlapping IP addresses are used in the UP function. See NOTE 1. | — | — | X | X | Network Instance |
| Time of First Packet | C | This IE shall be present if available for this URR. | — | X | X | X | Time of First Packet |
| Time of Last Packet | C | This IE shall be present if available for this URR. | — | X | X | X | Time of Last Packet |
| Usage Information | C | This IE shall be present if the UP function reports Usage Reports before and after a Monitoring Time, or before and after QoS enforcement. When present, it shall indicate whether the usage is reported for the period before or after that time, or before or after QoS enforcement. | X | X | X | X | Usage Information |
| Query URR Reference | C | This IE shall be present if this usage report is sent as a result of a query URR received in an PFCP Session Modification Request and the Query URR Reference IE was present in the PFCP Session Modification Request. When present, it shall be set to the Query URR Reference value received in the PFCP Session Modification Request. | X | X | X | X | Query URR Reference |

TABLE 3-continued

| | | | | | | | |
|---|---|---|---|---|---|---|---|
| Event Time Stamp | C | This IE shall be present, if the report is related to an event. When present, it shall be set to the time when the event occurs. Several IEs with the same IE type may be present to report multiple occurrences for an event for this URR ID. | — | X | X | X | Event Time Stamp |
| Ethernet Traffic Information | C | This IE shall be present if Ethernet Traffic Information needs to be reported. See Table 7.5.8.3-3. | — | — | — | X | Ethernet Traffic Information |
| URI/SNI Information | C | Several IEs with the same IE type may be present to report multiple occurrences for an event for this URR ID. | — | X | X | X | URI/SNI Information |

NOTE 1:
This is the case for unsolicited application reporting by the TDF. The Network instance is required when the UE IP address cannot be used to determine the corresponding PDN connection.

Specifically, according to the present disclosure, the PFCP protocol is extended by adding a new URI/SNI Information IE, as shown in bold in the following Table 3, in a Usage Report IE within PFCP Session Report Request message.

The URI/SNI information IE within the Usage Report IE may be defined as shown in Table 4.

TABLE 4

URI/SNI information IE within Usage Report IE

Octet 1 and 2
Usage Report IE Type = 80 (decimal)
Octets 3 and 4
Length = n

| Information elements | P | Condition/Comment | IE Type |
|---|---|---|---|
| URI/SNI ID | M | This IE shall identify the URI/SNI. NOTE: The full URI/SNI is only sent once. | URI/SNI ID |
| URI/SNI | C | The URI/SNI | URI/SNI |
| Uplink Volume Measurement | C | This IE shall be present if a uplink volume measurement needs to be reported. | Uplink Volume Measurement |
| Downlink Volume Measurement | C | This IE shall be present if a downlink volume measurement needs to be reported. | Downlink Volume Measurement |
| Start Time | C | Indicates when the URI/SNI was accessed. Several IEs with the same IE type may be present to report multiple occurrences for an event for this URR ID. | Start Time | each recorded SNI. As an example, the usage report includes SNI=X, vol=A, start time=T1; SNI=Y, vol=B, start time=T2 and so on.

At step 509, the SMF 16 sends a "PFCP Session Report Response" message to the UPF 14. The SMF 16 also processes the information reported by the UPF 14.

With the usage report received from the UPF 14, at step 510, the SMF 14 triggers online/offline charging including volume and optionally timestamp on a per SNI basis. At step 511, the SMF 14 triggers a "Nchf Charging Request" message including all the information in URI/SNI Information IE, to the CHF 20. For the above example, the "Nchf Charging Request" message includes SNI=X, Volume A, Start Time=T1; SNI=Y, Volume B, Start Time=T2, showing usage information for each SNI.

At step 512, the CHF 20 confirms receipt of the URI/SNI Information by sending a "Nchf Charging Response" message to the SMF 14.

Following that, at step 513, the CHF 20 applies a corresponding logic, which for example reflects the SNI volumes and optionally timestamps in the charging record for the subscriber.

As an example, the following format may be used in CDRs as applicable for URI. It can be contemplated by those skilled in the art that the following format can be easily extended for SNI.

```
URI ::= SEQUENCE
{
    count            [1] INTEGER OPTIONAL,
    uri              [2] IA5String OPTIONAL,
    uriIdentifier    [3] INTEGER OPTIONAL,
    uriDataVolumeUplink [4] INTEGER OPTIONAL,
    uriData VolumeDownlink [5] INTEGER OPTIONAL,
    listOfUriTimeStamps [6] SEQUENCE OF TimeStamp OPTIONAL
}
```

At step 508, the UPF 14 sends a "PFCP Session Report Request" message to the SMF 16, to report the traffic usage on per SNI basis.

Specifically, the PFCF Session Report message identifies a PFCP session for which the report is sent and includes information to be reported, such as volume and start time for The sequence diagrams in FIGS. 4 and 5 show an example on URI and/or SNI level reporting enabled for the default PDR. However, URI and/or SNI level reporting can be enabled for any PDR other than the default PDR.

It will be understood that the solution described in the present disclosure applies not only to 5G network architecture, but also to 4G systems, just by replacing: the PCF by a Policy and Charging Rules Function, PCRF, the SMF by a Packet Data Network Gateway control plane function, PGW-C, or a Traffic Detection Function Control plane function, TDF-C, and the UPF by a Packet Data Network Gateway user plane function, PGW-U, or a Traffic Detection Function userl plane function, TDF-U.

Figure 6:
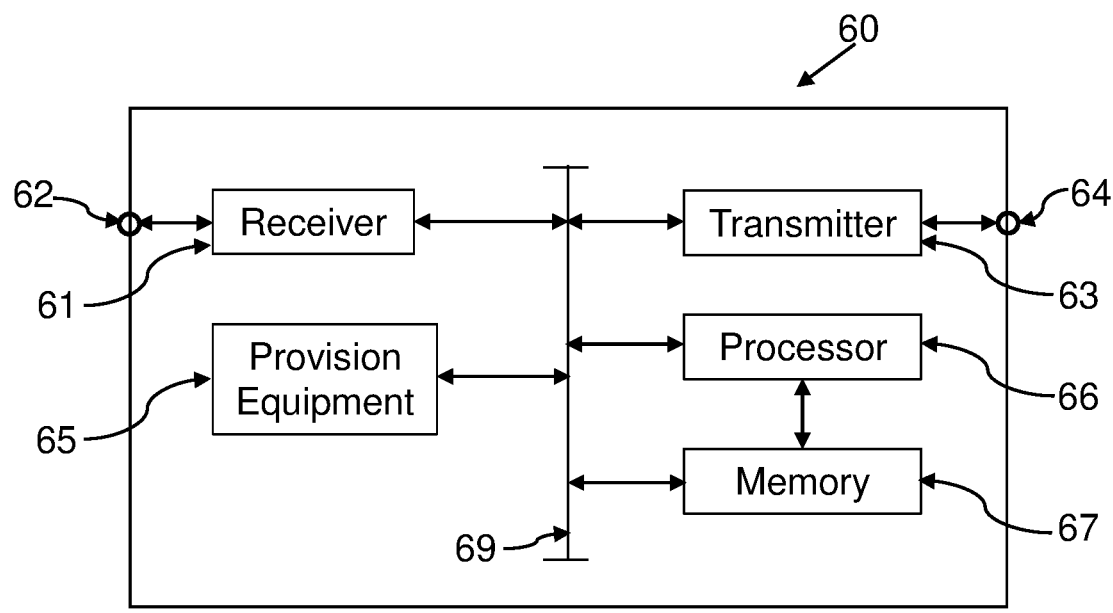
FIG. 6 schematically illustrates an example of an SMF in accordance with the present disclosure.

FIG. 6 schematically illustrates an example of an SMF 60 in accordance with the present disclosure. The SMF 60 comprises a receiver 61, 62 arranged to receive messages, such as processing rules, from other network functions, NFs, such as a PCF in the core communication network. The SMF 60 also comprises a transmitter 63, 64 arranged to transmit messages, such as the processing rules, to other NFs, such as a UPF in the core communication network. It may be understood by a skilled person that the receiver 61, 62 and transmitter 63, 64 are separately shown merely for illustrative purposes. The combined functionality may be achieved by a transceiver, for example.

The SMF 60 further comprises a provision equipment 65 arranged for provisioning a NF such as the UPF. Specifically, the provision equipment 65 provisions the processing rules enabling URI and/or SNI level processing with the UPF.

The SMF 60 further comprises a processor 66 and a memory 67. The memory 67 may be arranged to store a computer program product which when executed by the processor 66 causes the SMF 60 to perform a method according to the present disclosure. The internal components communicate with one another using an internal bus 69.

Figure 7:
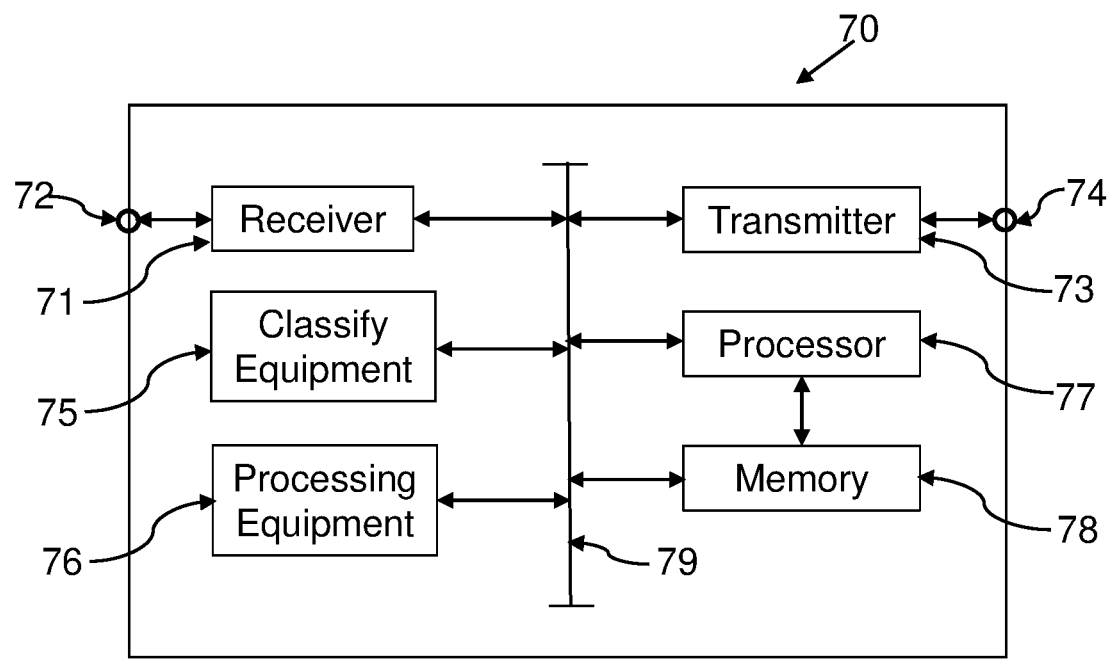
FIG. 7 schematically illustrates an example of a UPF in accordance with the present disclosure.

FIG. 7 schematically illustrates an example of a UPF 70 in accordance with the present disclosure. The UPF 70 comprises a receiver 71, 72 arranged to receive messages, such as processing rules, from other network functions, NFs, such as the SMF 60 in the core communication network. The UPF 70 also comprises a transmitter 73, 74 arranged to transmit messages, such as usage report, to other NFs, such as the SMF 60 in the core communication network. It may be understood by a skilled person that the receiver 71, 72 and transmitter 73, 74 are separately shown merely for illustrative purposes. The combined functionality may be achieved by a transceiver, for example.

The receiver 71, 72 may further be arranged for receiving user traffic from a UE, for example.

The UPF 70 further comprises a classify equipment 75 arranged for classifying the user traffic received from the UE according to a predefined PDR.

The UPF 70 further comprises a processing equipment 76 arranged for processing the user traffic in accordance processing rules enabling URI and/or SNI level processing policy.

The UPF 70 further comprises a processor 77 and a memory 78. The memory 78 may be arranged to store a computer program product which when executed by the processor 77 causes the UPF 70 to perform a method according to the present disclosure. The internal components communicate with one another using an internal bus 79.

Figure 8:
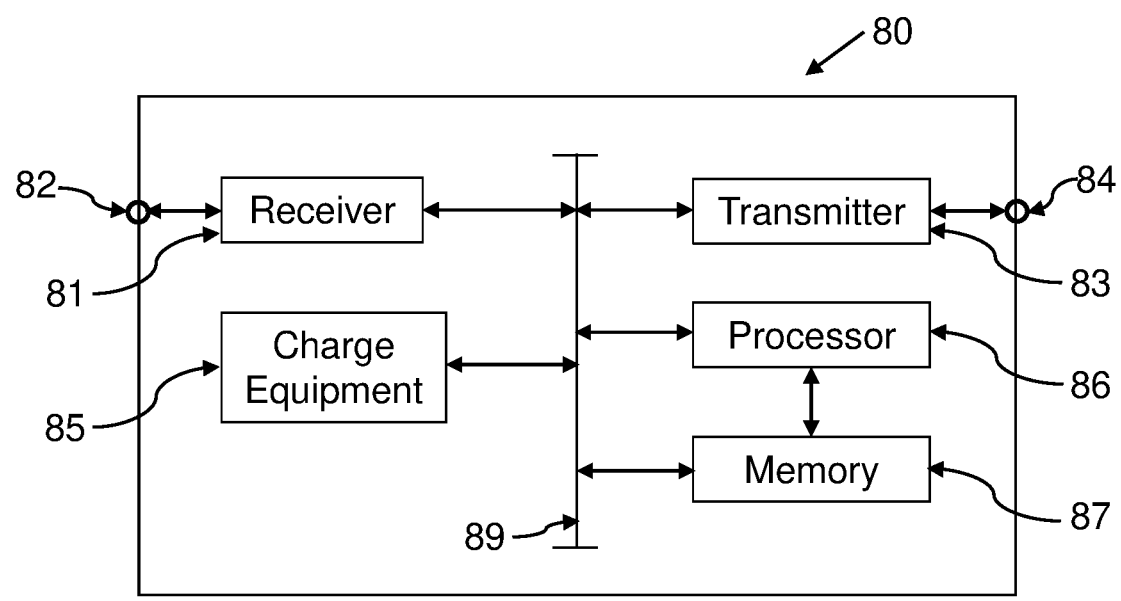
FIG. 8 schematically illustrates an example of a CHF in accordance with the present disclosure.

FIG. 8 schematically illustrates an example of a CHF 80 in accordance with the present disclosure. The CHF 80 comprises a receiver 81, 82 arranged to receive messages, such as a charging request including at least one of URI and SNI information, from other network functions, NFs, such as the SMF 60 in the core communication network. The CHF 80 also comprises a transmitter 83, 84 arranged to transmit messages, such as a charging response, to other NFs, such as the SMF 60 in the core communication network. It may be understood by a skilled person that the receiver 81, 82 and transmitter 83, 84 are separately shown merely for illustrative purposes. The combined functionality may be achieved by a transceiver, for example.

The CHF 80 further comprises a charging equipment 85 arranged for charging, user traffic by applying a logic reflecting the at least one of URI and SNI information.

The CHF 80 further comprises a processor 86 and a memory 87. The memory 87 may be arranged to store a computer program product which when executed by the processor 86 causes the CHF 80 to perform a method according to the present disclosure. The internal components communicate with one another using an internal bus 89.

The present disclosure is not limited to the examples as disclosed above, and can be modified and enhanced by those skilled in the art beyond the scope of the present disclosure as disclosed in the appended claims without having to apply inventive skills and for use in any data communication, data exchange and data processing environment, system or network.

The invention claimed is:

1. A method of provisioning, by a Session Management Function, SMF, processing rules for user traffic at a User Plane Function, UPF, in a core network of a telecommunication network, said core network comprising an Access and Mobility Management Function, AMF and a Policy Control Function, PCF, said method comprising the steps of:
   transmitting, by said SMF, to said PCF a request for obtaining processing rules for user traffic;
   receiving, by said SMF, from said PCF, the processing rules that enable at least one of a Uniform Resource Identifier, URI, level processing policy and a Server Name Indication, SNI, level processing policy for said user traffic, wherein the URI level processing policy and the SNI level processing policy configure the UPF to perform a URI level traffic measurement and an SNI level traffic measurement on a per URI and per SNI basis, and
   provisioning, by said SMF, said received processing rules with said UPF.

2. The method according to claim 1, wherein said transmitting step is performed in response to receiving, by said SMF, a request for establishing a user traffic session from said AMF.

3. The method according to claim 1, wherein said URI level processing policy and SNI level processing policy are comprised in policy data preconfigured in a Unified Data Repository, UDR.

4. The method according to claim 3, wherein said policy data comprises an indication that at least one of said URI level processing policy and said SNI level processing policy is applicable to predefined processing rules, said provisioning comprises a step of configuring, by said SMF, said processing rules as pre-defined processing rules with said UPF.

5. The method according to claim 1, wherein said provisioning step is performed during a Packet Forwarding Control Protocol, PFCP, session establishment procedure and comprises provisioning an enforcement action associated with a Packet Detection Rule, PDR, with said processing rules, said PFCP session related to said user traffic.

6. The method according to claim 5, wherein said enforcement action comprises a Usage Reporting Rule, URR, a bit in a URR related data item at said PFCP session establishment procedure is used to indicate provisioning of said processing rules with said URR.

7. The method according to claim 1, further comprising the following step prior to said transmitting step:

receiving, by said SMF, a report on supporting at least one of URI level processing policy and SNI level processing policy from said UPF, in particular by using a data item of UP Function Features.

8. A method of processing, by a User Plane Function, UPF, user traffic in a telecommunication network, said method comprising the steps of:

receiving, by said UPF, user traffic from a User Equipment, UE;

classifying, by said UPF, said user traffic according to a predefined Packet Detection Rule, PDR;

processing, by said UPF, said classified user traffic, in accordance with predefined processing rules that enable at least one of a Uniform Resource Identifier, URI, level processing policy and a Server Name Indication, SNI, level processing policy, wherein the URI level processing policy and the SNI level processing policy configure the UPF to perform a URI level traffic measurement and an SNI level traffic measurement on a per URI and per SNI basis.

9. The method according to claim 8, wherein said SNI level processing policy is a Usage Reporting Rule, URR, said processing step comprises recording a volume and optionally a timestamp of said classified traffic on at least one of URI and SNI basis.

10. The method according to claim 9, further comprising reporting said recorded volume and optional timestamp when a report condition is triggered.

11. The method according to claim 10, wherein said reporting is based on at least one of a URI and SNI data item comprised in a usage report data item of a PFCP session report request.

12. The method according to claim 8, further comprising forwarding, by said UPF, said classified user traffic to a destination node.

13. A method of charging, by a Charging Function, CHF, user traffic in a telecommunication network, the method comprising the steps of:

receiving, by said CHF, from a Session Management Function, SMF, a charging request including at least one of URI and SNI information, said at least one of Uniform Resource Identifier, URI, and Server Name Indication, SNI information comprises a volume and optionally a timestamp for said user traffic based on at least one of per URI and SNI basis, and charging, by said CHF, said user traffic by applying a logic reflecting said at least one of URI and SNI information.

* * * * *